Sept. 13, 1966
W. C. BROWN
3,273,011
TRAVELING FAST-WAVE DEVICE
Filed Oct. 29, 1962
3 Sheets-Sheet 1
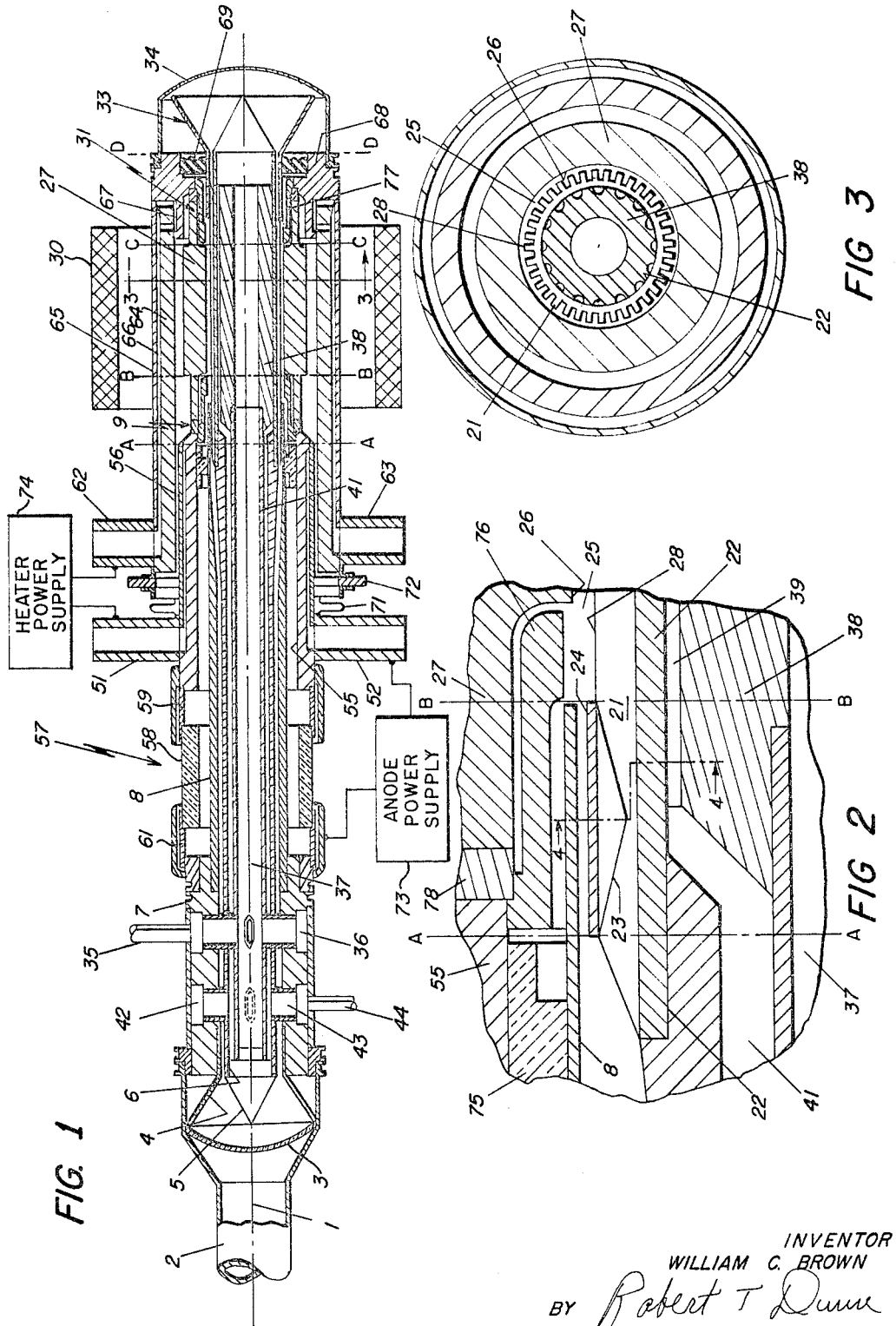
INVENTOR
WILLIAM C. BROWN
BY Robert T. Dunne
AGENT Sept. 13, 1966   W. C. BROWN   3,273,011
TRAVELING FAST-WAVE DEVICE
Filed Oct. 29, 1962   3 Sheets-Sheet 2

INVENTOR
WILLIAM C. BROWN
BY Robert T. Dunn
AGENT

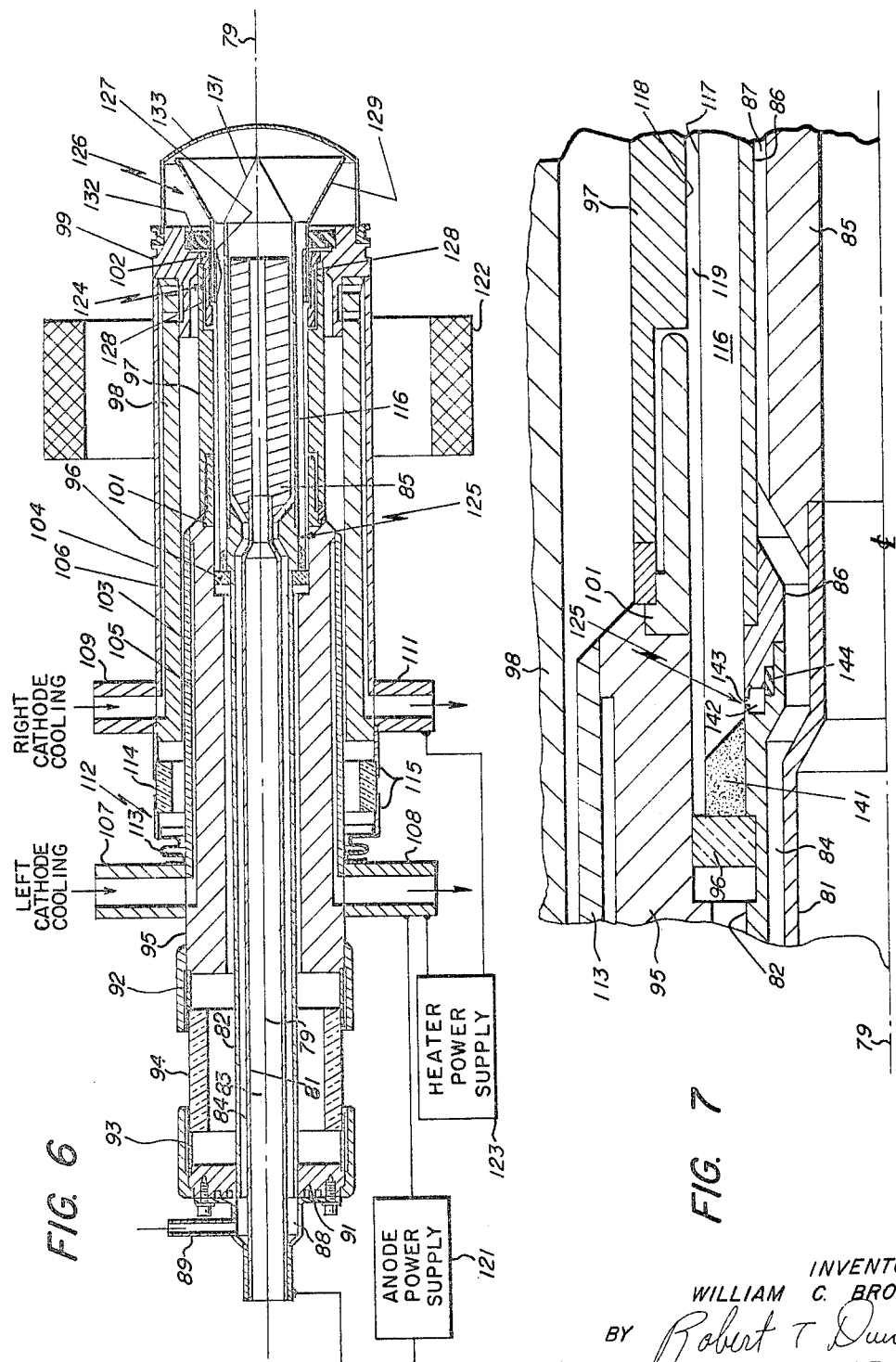

United States Patent Office 3,273,011
Patented Sept. 13, 1966

3,273,011
TRAVELING FAST-WAVE DEVICE
William C. Brown, Weston, Mass., assignor to Raytheon Company, Lexington, Mass., a corporation of Delaware
Filed Oct. 29, 1962, Ser. No. 233,510
5 Claims. (Cl. 315—39)

This invention relates generally to traveling wave devices wherein interaction between the fields of electromagnetic waves and electrons moving in transverse directions occurs, and more particularly to an amplifier and an oscillator for operation at millimeter wave frequencies.

Heretofore, traveling wave electron discharge devices for amplifying or generating frequency signals have included a slow wave propagating structure which effectively slows down the wave or rather the phase velocity of the wave to the velocity of electrons permitting an exchange of energy between the wave and the electrons. The slow wave structure in such devices is designed in consideration of the operating frequency of the device, and so the dimensions of the structure are limited by the frequency of the wave. At millimeter wave frequencies the parts of the structure become minute and difficult to fabricate. In addition, such minute parts do not have capacity to carry high currents, and the device cannot produce high power.

It is one object of the present invention to provide a traveling wave device for operation at millimeter wave frequencies including structure for conducting fast waves so that fields of said waves exchange energy with an electron space charge, and including relatively rugged anode and cathode structures and structure for cooling the anode and cathode.

The present invention comprises a substantially cylindrical anode including a plurality of longitudinally disposed vanes defining wave conducting spaces for conducting a plurality of separate waves substantially uncoupled from each other adjacent a cylindrical interaction space which contains an electron space charge driven through the interaction space by suitable D.C. electric and magnetic fields, electron motion being transverse to the direction of the waves. The interaction space is bounded between concentric cathode and anode structures, and concentric annular cooling conduits electrically insulated from each other are provided, one for cooling the anode, one for cooling one end of the cathode, and one for cooling the other end of the cathode. Power supply voltages are coupled to opposite ends of the cathode and to the anode to thereby heat the cathode and provide a radial electric field in the interaction space bounded by the anode and cathode which, in conjunction with an axial magnetic field in the interaction space created by an external magnet, compels the electron space charge to move continuously through the interaction space in a direction substantially transverse to the direction of propagation of the waves. The waves conducted in adjacent spaces between vanes are shifted in relative phase so that along the interaction space, adjacent waves are out of phase. In operation, the space charge is phase focused by the waves so that the space charge has a longitudinal phase velocity which synchronizes with the phase velocity of the waves resulting in efficient interaction between the waves and electron space charge. This phase focusing is a result of the circular motion of the space charge, the axial phase velocity of the waves and the phase difference between waves in adjacent of the spaces between anode vanes.

In one embodiment which performs as a traveling wave amplifier waves are launched into the anode wave conducting spaces from a circular waveguide. The phase shifting structure causes the waves in adjacent spaces to be shifted in phase λ/2 relative to each other, and these waves phase focus the space charge in the interaction space. However, there is a net flow of energy from the space charge to the waves, and, thus, the waves are amplified and emerge at the opposite end of the structure after incurring a second λ/2 differential shift which brings all waves into like phase considerably amplified with respect to the waves initially launched from the waveguide.

Another embodiment of the invention operates as an oscillator similar in some respects to the stabilotron described in, for example, United States Patent 3,027,521 which issued March 27, 1962, to E. J. Shelton, Jr. The structure is similar in many respects to the above-described amplifier but includes a wave energy absorbing load at one end of the wave conducting spaces with a resonant cavity immediately adjacent thereto tuned to the operating frequency. The output is located at the other end of the wave conducting passages and includes a partially reflective load. Operation is similar to the amplifier insofar as the waves experience gain in the direction of the output. However, the partially reflective load reflects some of the amplified wave which travels back toward the other end of the wave conducting passages at substantially constant amplitude and is rereflected from the cavity and amplified. Waves at frequencies substantially beyond operating frequency are not rereflected but are absorbed by the load.

Other features and objects of the invention will be apparent from the following descriptions of embodiments of the invention taken in conjunction with the drawings in which:

FIG. 1 illustrates a plan-sectional view of a traveling wave amplifier including features of the invention;

FIG. 2 illustrates a greatly enlarged view of part of FIG. 1;

FIGS. 3 and 4 illustrate enlarged sectional views taken transverse to the axis of the device shown in FIG. 1;

FIG. 6 is a plan-sectional view taken through the axis of the traveling wave oscillator incorporating features of the present invention;

FIG. 7 is an enlarged view of a section of FIG. 6;

Figure 4:
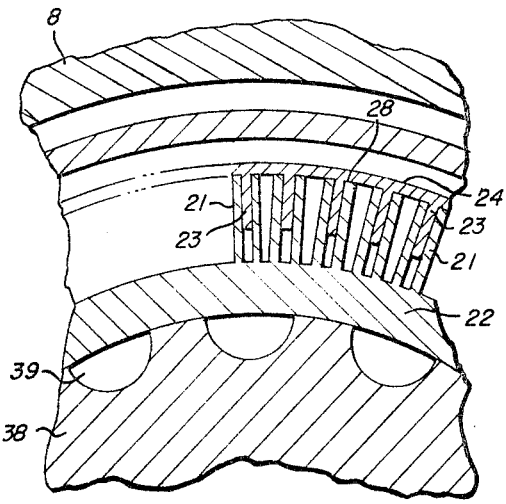

FIG. 1 is a plan-sectional view of a traveling wave amplifier incorporating features of the present invention. Various parts of the structure shown in FIG. 1 are figures of revolution about the axis 1 of the device. Parts which are not figures of revolution about the axis 1 will be described with reference to other figures by more detailed description included hereinbelow.

Waves are launched into one end of the device from a substantially circular waveguide 2 which preferably conducts the waves in a $TE_{01}$ mode. The electric field of waves conducted in this mode is represented by a circular vector concentric with the axis 1. The waves are launched through a sealed window 3 into a substantially coaxial transition section defined by an outer conductor 4 and an inner conical conductor 5. The coaxial transition connects to a coaxial transmission path defined by an inner tubular conductor 6 concentric with the axis 1 and the outer tubular conductors 7 and 8 also concentric with the axis 1. The coaxial transmission path defined by the space between tubes 6 and 8 terminates at a phase shift section 9 which is shown considerably enlarged in FIG. 2.

The waves conducted along the coaxial transmission path are launched into the phase shift section 9 and simultaneously energize a multitude of wave conducting structures. These wave conducting structures are defined by vanes 21 which project radially from a cylindrical shell 22. FIG. 4 which illustrates a transverse sectional view taken as shown in FIG. 2 shows the relative positioning of the vanes. Since the waves propagating through the spaces between the vanes are simultaneously launched from the coaxial transmission line, which conducts in a $TEM_{01}$ mode, waves conducted through adjacent spaces between the vanes will be in phase, and the direction of propagation through the spaces will be parallel to the axis 1. This phase relationship will continue up to the transverse section AA shown in FIG. 2.

As the waves are conducted past section AA, the phase relationship between waves in adjacent spaces shifts until waves in adjacent spaces are 180° out of phase. This phase shift in section 9 is caused by triangular-shaped conductive plates such as 23 which project into alternate spaces between the vanes 21 from support cylinder 24 as shown enlarged in FIG. 2. As a result, the waves will emerge at section BB with waves in adjacent spaces 180° out of phase. The purpose of this phase shift and the preference that it be 180° will be more clearly understood with reference to discussion of the interaction between the waves and the electron space charge included hereinbelow.

The interaction region in which the fringing fields of the waves conducted in the spaces between the vanes interacts with the electron space charge exchanging energy with the electrons is included substantially between sections BB and CC shown in FIG. 1. The interaction space 25 (shown also in FIG. 5) is annular, and its radial thickness is on the order of one-half electrical wavelength of operating frequency. The outer radial boundary of the interaction space 25 is defined by the cylindrical cathode surface 26. Cathode surface 26 is preferably the inner wall of a cylindrical block of tungsten 27 which is accurately machined to maintain the radial thickness of the interaction space uniform throughout. The inner radius of the interaction space 25 is defined by the ends 28 of the vanes 21. The vanes, as already mentioned, are preferably formed by cuts in a cylinder 22, the cuts being radial and substantially parallel to the axis of the cylinder. The outer diameter of cylindrical block 22 is preferably machined so that the ends of the vanes 21 define the inner radius of the interaction space 25.

Figure 5:
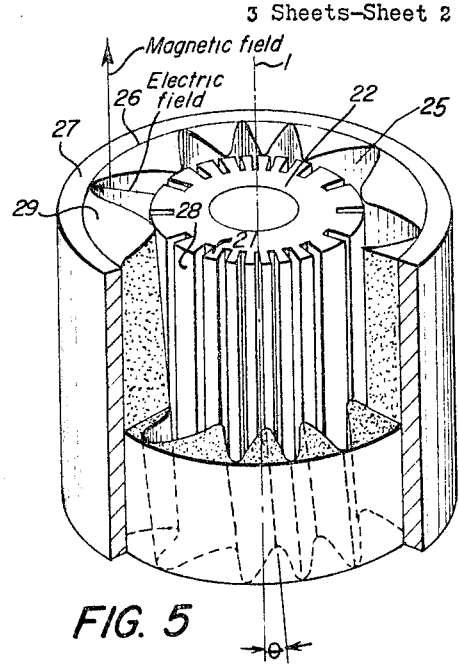
FIG. 5 is a three-quarter break-away view of a symbolic representation of the interaction space of the device to illustrate the orientation of the space charge spokes relative to the wave conducting structures.

In operation, there is only slight coupling between the waves conducted in separate spaces between the vanes. Accordingly, the fact that waves conducted in adjacent spaces are in opposite phase results in very little cross moding or cancellation, and the phase relationship between the waves is maintained at section CC where the amplified waves emerge from the interaction space. In the interaction space, electrons flowing from the cathode surface 26 form an annular space charge which moves circumferentially about the axis 1. As shown in FIG. 5, the space charge 29 is caused to move circumferentially by transverse electric and magnetic fields which are set up in the interaction space. The transverse electric field is substantially radial and is bounded between the ends 28 of the vanes 21 and the cathode surface 26. The transverse magnetic field in the interaction space is produced by a solenoid magnet 30 concentric with the axis 1 so as to produce a longitudinal magnetic field in the interaction space. The fringing fields of the waves conducted through the spaces between the vanes 21 have a phase focusing effect on the electron cloud. Since waves in adjacent spaces are 180° out of phase, the electron cloud assumes the shape of a twisted fluted column or a twisted inside gear, the angular separation between the teeth of this gear being substantially equal to the angular separation between alternate of the spaces between the vanes 21. This type of phase focusing extends substantially throughout the length of the interaction space from section BB to CC. The space charge having been focused in this manner is synchronized axially with the waves conducted through each of the spaces between vanes and imparts energy to the waves amplifying them.

The amplified waves emerge from the interaction region at section CC, the waves in adjacent spaces being in opposite phase. In order to make use of this amplified wave energy it is preferred to bring the waves in adjacent spaces into like phase. This is accomplished by phase shift section 31 constructed substantially the same as phase shift section 9. The only substantial difference between phase shift sections 9 and 31 is that in phase shift section 9 the conductive plates 23 project into, for example, the odd numbered spaces between the vanes 21, whereas in phase shift section 31, the plates 32 (which are similar to plates 23) project into the even numbered spaces between the vanes 21. Thus, the waves conducted in odd numbered spaces between vanes are phase shifted before amplification, whereas waves conducted in even numbered spaces are shifted after amplification by the same amount. The amplified waves emerge at section DD in like phase and radiate from coaxial horn 33 through a transparent enclosure 34 into space.

Various annular passages are provided as shown in FIG. 1 for conducting cooling fluid to the anode and cathode of the device, particularly in the region of the interaction space. The anode, and particularly the vanes 21 which dissipate most of the heat generated in the device, is cooled by fluid introduced through conduit 35 to an annular manifold 36 which connects to inner fluid conduit 37 which is coaxial with the axis 1 and which seals at one end to a heavy cylindrical tube 38 which is in direct thermal contact with the inside walls of cylinder 22 from which the fins 21 emanate. The fluid flows along the axis through the length of tube 38 and returns through a number of longitudinal grooves 39 which are cut into the outer surface of the tube 38. The grooves 39 meet an annular space 41 defined between the outer walls of the tube 37 and the inner wall of tubular conductor 6. A second annular manifold 42 adjacent manifold 36 couples to annular fluid passage 41 by a plurality of radial tubes 43, and an outlet conduit 44 carries the fluid back to a sump.

The end of the cathode closest to phase shift section 9 is cooled by fluid conducted in by conduit 51 and out by conduit 52. Both these conduits connect to an annular passage 53 defined between inner structural cylinder 55 and cylinder 56 both concentric with the axis 1. Structural cylinder 55 is electrically insulated from all of the above-mentioned anode cooling structure, but is rigidly connected thereto by electrical insulating section 57. Insulating section 57 includes insulating cylinder 58 attached to structural parts 55 and 7 by, for example, Kovar sleeves 59 and 61 as shown.

The other end of the cathode closest to phase shift section 31 is cooled by a separate fluid conduit system which is electrically insulated from the first. Cooling fluid is conducted into this second system by conduit 62 and out by conduit 63. The second conduit system consists of outer structural cylinder 64 enclosed by cylindrical shell 65 defining an annular conduit 66 therebetween. Annular conduit 66 connects to annular manifold 67 defined in part by a circular groove in cathode support ring 68. Cathode support ring 68 attaches directly to one end of the cathode 27 and is connected to the coaxial horn 33 by a ceramic ring 69 adding rigidity between the anode and cathode parts at the output of the device. The other end of cathode 27 connects to inner cylindrical structure 55 which in part defines an annular passage for cooling that end of the cathode. As a result of the above-described construction, the end of the cathode adjacent phase shift section 9 is cooled by a separate conduit system from that which cools the end of the cathode adjacent phase shift section 31. Further-more, these conduit systems are electrically insulated from each other, and both are electrically insulated from the aforementioned anode structures. Expansion and contraction of the heated cathode is accommodated by the diaphragm 71 which connects to cylinder 56 at one end and to an insulating ring 72 at its other end. Insulating ring 72 also connects to outer structural cylinder 64 which defines part of the fluid conduit for cooling the end of the cathode adjacent phase shift section 31.

In operation, the aforementioned anode structure or one or the other of the ends of the cathode which electrically terminate in conduits 51 and 62, respectively, may be connected to ground, and suitable potentials applied to the others by anode power supply 73 and heater power supply 74 to provide the required potential between anode and cathode to sustain the required radial electric field strength in the interaction space 25 and also to provide a high current flow from one to the other end of the cathode to heat the cathode. It is not necessary that this cathode current be continuous; it may be pulsed to periodically bring cathode temperature to the proper operating level. Thereafter, cathode temperature may be maintained by back bombardment of electrons.

As already mentioned, each of the phase shift sections 9 and 31 are very similar in operation and construction. Each includes triangular-shaped plates such as 23 in section 9, and 32 in section 31 which project into preselected spaces between the vanes 21 for producing the same total phase shift of waves propagating through said spaces from one end of the device to the other. The plates 23 are preferably attached to a short cylinder section 24 enclosing the vanes and defining phase shift section 9. Phase shift section 31 is formed by similar structure including a short cylinder section carrying plates 32 and located adjacent the other end of the interaction space.

The end of cylinder 8 nearest the phase shift section 9 is preferably rigidly held by insulating support ring 75 which is in turn fixed to the inner diameter of structural cylinder 55. The purpose of insulator 75 is to electrically insulate cylinder 55 which is at cathode potential from cylinder 8 which is part of the anode circuit, while at the same time providing structural support between the two. Immediately adjacent the insulative support 75 is a cylindrical member 76 which attaches to both the structural cylinder 55 and to the cathode 27 and is spaced from the cathode 27 along a substantial length of the surface of the cathode to shield the immediately adjacent portion of the anode structure cylinder 8 from bombardment by electrons emanating from this section of the cathode. A similar shield 77 is provided at the other end of the cathode for shielding parts of the anode structure from similar electron bombardment. Both of these shielding cylinders 76 and 77 are preferably attached to conductive rings such as 78 which affix them to opposite ends of the cathode 27. As already mentioned, the cathode is preferably composed substantially of tungsten which has higher electrical resistivity than, for example, copper. Accordingly, the cathode rings such as 78 and the cathode structural cylinders 55 and 64 are preferably made of copper to provide low impedance path for current which flows through the cathode. This current heats the cathode but does not substantially heat the structural cylinders.

Turning next to FIG. 6 there is shown a plan-sectional view of an oscillator incorporating features of the invention and which is constructed similar in many respects to the amplifier shown in FIG. 1. For example, the oscillator shown in FIG. 6 includes an anode assembly and a cathode assembly which are generally figures of revolution about an axis 79. Opposite ends of the cathode assembly are electrically coupled only through the cathode itself, and each end includes fluid conduits for cooling the cathode. In addition, a conduit system is provided for cooling the anode in a very similar manner to that already described above with reference to FIG. 1. The anode assembly includes concentric tubes 81 and 82 defining passages 83 and 84 for conducting fluid to and from the electrically active parts of the anode. As shown by the enlarged view in FIG. 7, tube 81 seals to anode cylinder 85 which in turn supports the radially disposed anode wave conducting structures formed in the outside walls of anode cylinder 86 similar to the wave conducting structure already described with reference to FIG. 1.

Channels such as 87 are provided along the outer surface of anode cylinder block 85 extending longitudinally (just as channels 39 in FIG. 4) providing a passage for the cooling fluid. Thus, fluid introduced at one end of tube 81 flows along passage 83 through the grooves 87 into the annular passage 84 and then to a manifold 88 from which it flows through a conduit 89 to a sump. The manifold 88 is formed against annular end plate 91 which seals one end of the tube.

The cathode assembly is supported from but electrically insulated from the anode assembly by two Kovar sleeves 92 and 93 connected by a ceramic cylinder 94. Sleeve 92 connects to the cathode structural cylinder 95, and sleeve 93 connects to end plate 91. The other end of the cathode structural cylinder 95 is rigidly affixed to the outer walls of anode tube 82 by an electrically insulating ring spacer 96. The same end of the cylinder 95 supports one end of the cathode 97. The other end of the cathode 97 is supported from an outer cathode structural cylinder 98 to which it is affixed by the cathode support ring 99. Cylindrical electron shields 101 and 102 are positioned at each end of the cathode 97 and supported from the cathode structural members. These end shields serve to shield the anode from electrons emitted from the ends of the cathode outside the interaction space just as already described above with respect to FIG. 1.

Separate fluid passages for cooling each end of the cathode are formed in conjunction with the cathode cylindrical structural members by inner and outer cathode cylinders 103 and 104. These define annular fluid passages 105 and 106. Passage 105 conducts fluid to cool the end of the cathode which is remote from the output, and passage 106 conducts fluid to cool the end of the cathode adjacent the output. Accordingly, the remote end of the cathode is cooled by fluid introduced at conduit 107, flows through annular passage 105 cooling the structural support cylinder 95 which conducts heat from the cathode, and returns through conduit 108 to a sump. The output end of the cathode is cooled by fluid introduced at conduit 109 which flows through annular passage 106 cooling the cylindrical support structure 98 and support ring 99 which conduct heat from the output end of the cathode. This fluid returns to a sump through conduit 111.

Expansions and contractions of the cathode 97 are accommodated by a flexible cylindrical joint 112 between cathode structural cylinders 95 and 98. This flexible joint consists of a diaphragm 113 which connects to ceramic cylinder 114 which in turn is rigidly affixed to the outer cathode structural support 98 by Kovar sleeves 115. Thus, the output and remote ends of the cathode 97 are electrically insulated from each other except through the cathode body itself.

The wave conducting part of the anode is formed by grooves cut longitudinally along the outer wall of a cylinder 86 to form radially disposed vanes such as 116 which extend along the length of the cylinder. The tips 117 of these vanes are spaced from the inside wall 118 of the cathode 97 defining an annular interaction space 119 therebetween. In operation, electromagnetic waves are conducted longitudinally through the spaces between the vanes, the waves in adjacent spaces being substantially uncoupled from each other. The fringing fields of the waves interact with an electron space charge in the interaction region 119 formed by electrons issuing from the cathode surface 118. Transverse D.C. electric and magnetic fields in the interaction region compel the space charge to move circumferentially through the interaction region. The D.C. electric field is radial and is bounded between the ends 117 of the vanes and cathode surface 118 energized by anode power supply 121. The D.C. magnetic field is axial and is provided by solenoid magnet 122 disposed concentric with the axis 79. The tungsten cathode 97 is heated by a high current flow provided by heater power supply 123 coupled between the ends of the cathode 97.

As already described with reference to FIG. 1, it is preferred that waves in adjacent spaces be in opposite phase or, in other words, waves in one group of alternate spaces are in one phase, whereas those in the other group of alternate spaces are in opposite phase. Otherwise, operation is similar in some respects to the operation of the oscillator device described in United States Patent 3,027,521 which issued on March 27, 1962, to E. J. Shelton, Jr. Operation of such an oscillator device as applicable to the present invention is described hereinbelow and discussed with relation to FIGS. 9 and 10. This operation requires that the waves of the proper frequency which are conducted in the adjacent spaces between the vanes reflect with equal reflectivity from the end of the structure which is most remote from the output. These reflected waves are then amplified as they are conducted toward the output and are launched from the output toward a target or utilization device. It is required that a portion of the amplified waves be reflected by the output and sent back for reflection again at the remote end of the tube and subsequent amplification. The portion of amplified waves which are reflected from the output are not substantially further amplified as they travel back toward the remote end of the interaction space. In other words, gain is substantially in only one direction, and that is toward the output.

One feature of the present invention already described above provides that the waves in adjacent spaces be in opposite phase. This phase relationship is obtained by phase shift section 124 located just before the output of the device. The phase shift section 124 serves to shift the phase of reflected waves which are conducted in the alternate spaces by 180° relative to the waves in spaces in between. These shifted waves travel to the remote end of the anode and are reflected from resonant section 125 back through the length of the interaction space toward the output, experiencing amplification in the process. The amplified waves then enter phase shift section 124 wherein the waves which were shifted in phase 180° before amplification are again shifted in phase 180° bringing them into phase coincidence with the waves which were not shifted before amplification so that all waves emerging from the phase shift section 124 are in phase and are launched from the output coaxial horn antenna 126 in like phase. The mode of propagation in the coaxial horn antenna 126 is substantially similar to a $TEM_{01}$ mode, the electric vectors of the wave forming closed circles coaxial with the axis of the tube.

The phase shift section 124 is similar to phase shift sections 9 and 31 shown in FIG. 1 and includes a plurality of triangular plates 127 inserted in alternate spaces so that waves in the alternate spaces are shifted in phase relative to waves in the spaces in between. The triangular plates 127 are preferably radially disposed and attached to cylinder section 128 which is attached to the ends of the vanes 116 and connects to the outer part 129 of the coaxial horn antenna 126. The inner part of the coaxial horn antenna is formed by a conical structure 131 attached to the end of the cylinder 86 from which the fins 116 are cut. An insulating support ring 132 serves to separate 128 and 129 which are part of the anode structure from the outer cathode structural cylinder 99, and a transparent window 133 forming a vacuum seal with the cathode structure completes the output part of the device.

The enlarged view of a section of the active parts at the remote end of the anode and cathode in FIG. 7 shows structure for selectively reflecting waves at the operating frequency of the device while absorbing other waves. As shown in FIG. 7, the spaces between vanes which define the wave propagating paths are loaded at the remote end with wave energy-absorbing material 141. Just in advance of this loading is a reflecting structure 125 including a cavity 142 formed within portions of the anode cylinders 82 and 86. The cavity 142 and each of the openings such as 143 which open into the wave conducting spaces between vanes are designed for resonance at the operating frequency. Accordingly, a virtual electrical short is provided at the openings 143 at the operating frequency, and operating frequency signals are reflected from the opening back toward the output of the device. On the other hand, signals which are not at operating frequency will not reflect from this opening and will be absorbed by the load 141. Thus, nonoperating frequency signals are attenuated, whereas operating frequency signals are reflected.

The cavity 142 is preferably substantially annular in shape and is, therefore, a figure of revolution about the axis 79 as viewed in FIG. 7. Spurious resonances in the cavity 142 which occur at higher order modes are attenuated by absorbing material 144 forming the inner wall of one corner of the annular cavity. This material attenuates currents which are required to support such spurious modes, and, therefore, attenuates the modes substantially limiting resonance of the cavity to operating frequency. The various parts shown in FIG. 7 are all figures of revolution about the axis 79 except for the vanes 116 which project radially from the lower part of anode cylinder 86.

Figure 8:
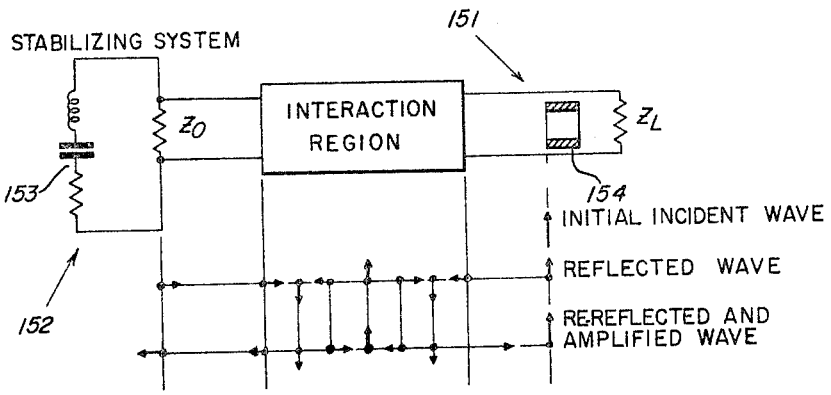
FIG. 8 is a schematic representation of the traveling wave oscillator shown structurally in FIGS. 5 and 6.
Figure 9:
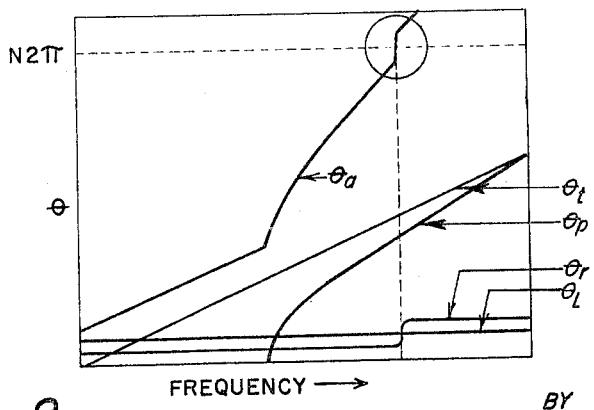
FIG. 9 includes curves to illustrate relationships between the frequency and phase of waves in adjacent wave conducting structures to show a theory of operation of the traveling wave oscillator described schematically in FIG. 9.

Operation of the oscillator shown in FIGS. 6 and 7 is illustrated by the schematic representation in FIGS. 8 and 9. More particularly, FIG. 8 illustrates operation which requires a certain amount of reflection at the output end 151 and at the remote end 152 of the interaction region. As shown in FIG. 9, the remote end 152 includes a tuned circuit 153 in parallel with a load resistance $\Xi_O$, and the output end includes a reflection device 154 and an output load $\Xi_L$. The tuned circuit 153 represents the annular cavity 142; load $\Xi_O$ represents absorbing material 141; and the reflection device 154 represents the reflecting action of the output end of the anode which includes the coaxial horn 126. The arrangement of arrows immediately below this schematic is intended to illustrate the phase of an initial, a reflected and rereflected waves which are conducted along a given wave conducting path between the vanes adjacent the interaction region. In the present invention the initial incident wave in adjacent spaces will be in the same phase. However, the phasing of the reflected and rereflected waves throughout the internal network and the stabilizing network will be oppositely phased in adjacent spaces between vanes. The principles, however, are the same and can be illustrated by showing the relative phasing of initial reflected and rereflected waves along a single one of the wave conducting spaces between the vanes. As shown in FIG. 8, a portion of each wave incident upon the output is reflected back through the interaction region. A portion of this wave is then rereflected from the tuned circuit 153 at the remote end and amplified as it proceeds through the interaction region toward the output. The system oscillates when there is sufficient feedback by way of the reflected wave from the output to sustain the oscillations and may be controlled by varying reflectivity of the output reflection means 154. Steady oscillations occur when the loop phase shift from the point of reflection at the output end to the point of reflection at the remote end and return, is an integral multiple of 360°. There are four phase shift components in this system which together compose the total phase shift of the system which constitutes the integral multiple of 360°. FIG. 9 is a plot of phase shift versus frequency showing the contribution of each of these four phase shift components to the total loop phase shift from output to remote end and back to output over a wide frequency range. In FIG. 9 $\Theta_a$ is the total phase shift of the system, $\Theta_t$ is the two wave phase shift from the reflection plane at the output end of the reflection plane at the remote end. $\Theta_p$ is the two wave phase shift which takes place in the interaction region, $\Theta_r$ is the phase shift which takes place at the reflection plane at the output, and $\Theta_l$ is the phase shift which takes place at the reflection plane at the remote end. As shown in FIG. 9, the slope of the curve $\Theta_a$ is very steep in the range of $\Theta = N2\pi$ indicating a high degree of frequency stability.

This concludes a specific description of certain embodiments of the present invention which provide an amplifier and an oscillator suitable for operation at millimeter wave frequencies. Both embodiments describe axial gain devices including a continuous cathode and a plurality of substantially uncoupled coextensive wave conducting structures cooled by fluid conducted through conduits which serve also to couple the anode and cathode to power supplies. Accordingly, the spirit and scope of the invention is set forth in the accompanying claims in which:

What is claimed is:
1. A traveling wave device comprising:
an anode structure;
said anode structure having a plurality of parallel axially-extending vanes defining a plurality of uncoupled electromagnetic wave conducting paths arranged side by side;
means communicating with said anode structure for shifting the phase of waves in alternately disposed paths whereby waves in adjacent paths are in opposite phase;
an electron emitting cathode structure coextensive with and surrounding said anode structure defining a substantially continuous interaction space therebetween;
means for establishing a magnetic field directed parallel to the axis of said anode structure and an electric field directed radially to said axis whereby the electrons form a space charge in the interaction space which circulates substantially circumferentially;
means for directing electromagnetic waves along the wave conducting paths in an axial direction to result in phase shifted fringing electric fields between adjacent vanes extending into the interaction space;
said crossed magnetic and electric fields together with said fringing electric fields imparting a phase focusing effect to the electron space charge such that the crossover point of said space charge relative to said traversing waves is in velocity synchronous relationship along a path coaxial to said wave paths whereby said waves are amplified by the net flow of energy from the electron space charge;
and means for launching said amplified waves into space disposed at one end of said device.

2. A traveling wave device in accordance with claim 1 wherein the phase shifting means at the end of said anode structure at which the electromagnetic wave enters serve to establish different phase values alternating from path to path and those means at the other end serve to restore uniformity of phase over the wave.

3. A traveling wave device in accordance with claim 1 wherein the phase shifting means at both ends effect phase shifts which are an odd number of half wavelengths.

4. A traveling wave device in accordance with claim 1 wherein said phase shifting means are disposed adjacent to only the output end of said anode structure to cause waves in alternate spaces to be shifted in phase by substantially 180° and directed back to the opposing end;
and means responsive to a predetermined operating frequency disposed at said opposing end for selectively reflecting certain waves for a second traversal, amplification and launching in said wave conducting paths while absorbing waves at the nonoperating frequency.

5. A traveling wave device in accordance with claim 4 wherein said selective reflection means comprise a tuned annular resonant cavity and an energy-absorbing material.

References Cited by the Examiner

UNITED STATES PATENTS

| | | | |
|---|---|---|---|
| 2,647,175 | 7/1953 | Sheer | 315—39.3 X |
| 2,687,777 | 8/1954 | Warnecke et al. | 315—3.6 X |
| 2,815,469 | 12/1957 | Sixsmith | 315—39.77 |
| 2,854,603 | 9/1958 | Collier et al. | 315—39.77 |
| 3,054,018 | 9/1962 | Paschke | 315—3.6 |
| 3,188,518 | 6/1965 | Phillips | 315—39 |

HERMAN KARL SAALBACH, *Primary Examiner.*

S. CHATMON, JR., *Assistant Examiner.*